(12) United States Patent
Gordon et al.

(10) Patent No.: US 11,717,038 B2
(45) Date of Patent: Aug. 8, 2023

(54) PAD FOR A GARMENT, PADDED GARMENT AND METHOD OF MANUFACTURING SAME

(71) Applicant: adidas AG, Herzogenaurach (DE)

(72) Inventors: Josh Robert Gordon, Herzogenaurach (DE); Nina Maria Ludwig, Nuremberg (DE); Bobbie John Monahan, Herzogenaurach (DE); Brady Campbell Anderson, Nuremberg (DE)

(73) Assignee: adidas AG, Herzogenaurach (DE)

( * ) Notice: Subject to any disclaimer, the term of this patent is extended or adjusted under 35 U.S.C. 154(b) by 488 days.

(21) Appl. No.: 16/731,677

(22) Filed: Dec. 31, 2019

(65) Prior Publication Data

US 2020/0128888 A1    Apr. 30, 2020

Related U.S. Application Data

(62) Division of application No. 14/572,095, filed on Dec. 16, 2014, now Pat. No. 10,548,357, which is a (Continued)

(30) Foreign Application Priority Data

Aug. 11, 2009    (EP) .................................... 09167637

(51) Int. Cl.
*A41D 13/015*    (2006.01)
*A41D 13/05*    (2006.01)
(Continued)

(52) U.S. Cl.
CPC ............ *A41D 13/015* (2013.01); *A41D 13/05* (2013.01); *A41D 31/28* (2019.02); *B32B 3/10* (2013.01);
(Continued)

(58) Field of Classification Search
CPC .............. A41D 13/015; A41D 31/0044; A41D 13/0151; A41D 13/0153; A41D 31/28;
(Continued)

(56) References Cited

U.S. PATENT DOCUMENTS 2,657,385 A    11/1953  Cushman et al.
2,871,481 A    2/1959   Helmet
(Continued)

FOREIGN PATENT DOCUMENTS

DE    40 29 686    3/1992
DE    196 40 263   4/1998
(Continued)

OTHER PUBLICATIONS

European Search Report for European Application No. 11192852.9, European Patent Office, The Netherlands, dated May 21, 2012, 6 pages.

*Primary Examiner* — Amy Vanatta
(74) *Attorney, Agent, or Firm* — Sterne, Kessler, Goldstein & Fox P.L.L.C.

(57) ABSTRACT

A pad for a garment includes a one piece structure comprising interconnected elements made from a compressible material. The elements are arranged such that, when the pad is in a non-deformed state, each element is spaced apart from adjacent elements by a void. The elements are interconnected such that, when the pad is deformed, a zigzag arrangement of at least three elements is formed and/or a void enclosed by at least two adjacent elements expands.

11 Claims, 7 Drawing Sheets

Related U.S. Application Data division of application No. 12/617,344, filed on Nov. 12, 2009, now Pat. No. 8,931,119.

(51) Int. Cl.
| | |
|---|---|
| *A41D 31/28* | (2019.01) |
| *B32B 3/10* | (2006.01) |
| *B32B 3/26* | (2006.01) |
| *B29C 45/00* | (2006.01) |

(52) U.S. Cl.
CPC ............ *B32B 3/26* (2013.01); *A41D 13/0153* (2013.01); *A41D 13/0158* (2013.01); *B29C 45/00* (2013.01); *Y10T 156/1062* (2015.01)

(58) Field of Classification Search
CPC .......... A41D 13/0158; A41D 19/01523; A41D 13/0156; A41D 13/05–13/0543; A41D 13/06–13/081; A41D 13/088; A41D 13/0506; A41D 13/0512; A41D 13/0531; A41D 13/0537; A41D 13/08; A42B 3/12; A42B 3/125; A42B 3/127; A42B 3/128; A63B 71/08; A63B 71/10; A63B 71/12–71/148; B29C 45/00; B29C 45/0017; B29C 45/0022; B29C 2045/1692; B32B 3/10; B32B 3/26; B32B 3/266; Y10T 156/1062; Y10T 156/1092
USPC ..................................................... 2/267, 268
See application file for complete search history.

(56) References Cited

U.S. PATENT DOCUMENTS

| | | | |
|---|---|---|---|
| 3,285,768 A | | 11/1966 | Habib |
| 3,660,849 A | | 5/1972 | Jonnes et al. |
| 3,675,244 A | | 7/1972 | Mayo et al. |
| 3,771,170 A | | 11/1973 | Leon |
| 4,183,156 A | | 1/1980 | Rudy |
| 4,195,362 A | | 4/1980 | Rolando |
| 4,219,945 A | | 9/1980 | Rudy |
| 4,272,850 A | | 6/1981 | Rule |
| 4,274,158 A | | 6/1981 | Pogorski et al. |
| 4,292,263 A | * | 9/1981 | Hanrahan ............ A41D 13/015 128/892 |
| 4,397,636 A | | 8/1983 | Ganshaw |
| 4,479,269 A | | 10/1984 | Balliet |
| 4,538,301 A | | 9/1985 | Sawatzki et al. |
| 4,602,385 A | | 7/1986 | Warren |
| 4,688,269 A | | 8/1987 | Maeshima |
| 4,807,301 A | | 2/1989 | Ferber |
| 4,936,029 A | | 6/1990 | Rudy |
| 5,014,354 A | | 5/1991 | Dumont |
| 5,020,547 A | | 6/1991 | Strock |
| 5,023,128 A | | 6/1991 | Fatool |
| 5,044,031 A | | 9/1991 | Sherwood et al. |
| 5,105,473 A | | 4/1992 | Valtakari |
| 5,337,418 A | | 8/1994 | Kato et al. |
| 5,360,653 A | * | 11/1994 | Ackley ................. A47C 27/146 428/167 |
| 5,368,910 A | | 11/1994 | Langdon |
| 5,416,924 A | * | 5/1995 | Sims ................... A41D 13/0568 2/24 |
| 5,487,710 A | | 1/1996 | Lavorgna et al. |
| 5,497,511 A | | 3/1996 | Zade |
| 5,499,460 A | | 3/1996 | Bryant et al. |
| 5,511,245 A | | 4/1996 | Hayes |
| 5,551,082 A | | 9/1996 | Stewart et al. |
| 5,713,143 A | | 2/1998 | Kendall |
| 5,717,997 A | | 2/1998 | Garcia |
| 5,720,045 A | | 2/1998 | Aldridge |
| 5,728,055 A | | 3/1998 | Sebastian |
| 5,860,163 A | | 1/1999 | Aldridge |
| 5,924,134 A | | 7/1999 | Taylor et al. |
| 5,924,140 A | | 7/1999 | Chi |
| 6,049,906 A | | 4/2000 | Aldridge |
| 6,055,670 A | | 5/2000 | Parker |
| 6,093,468 A | | 7/2000 | Toms et al. |
| 6,279,160 B1 | | 8/2001 | Chen |
| 6,408,446 B1 | | 6/2002 | Carrington |
| 6,743,325 B1 | | 6/2004 | Taylor |
| 7,082,621 B1 | | 8/2006 | Fratesi |
| 7,100,216 B2 | | 9/2006 | Matechen et al. |
| 7,412,731 B1 | | 8/2008 | Brassill |
| 7,448,522 B2 | | 11/2008 | Collier et al. |
| 7,484,250 B2 | | 2/2009 | Chiang |
| 7,533,423 B2 | | 5/2009 | Rudolph |
| 7,784,116 B2 | | 8/2010 | Gallo et al. |
| 7,891,026 B1 | | 2/2011 | Smith |
| 7,934,267 B2 | | 5/2011 | Nordstrom et al. |
| 7,958,653 B2 | | 6/2011 | Howlett et al. |
| 2004/0111782 A1 | | 6/2004 | Lenormand et al. |
| 2005/0081277 A1 | | 4/2005 | Matechen et al. |
| 2005/0098590 A1 | | 5/2005 | Collier et al. |
| 2006/0026732 A1 | | 2/2006 | Nordt et al. |
| 2006/0030804 A1 | | 2/2006 | Nordt, III et al. |
| 2006/0070165 A1 | * | 4/2006 | Nordt, III ............ A61F 5/0106 2/69 |
| 2006/0179545 A1 | | 8/2006 | Arensdorf et al. |
| 2007/0122590 A1 | * | 5/2007 | Lalvani ................... B32B 3/266 428/136 |
| 2008/0022431 A1 | | 1/2008 | Gallo et al. |
| 2008/0222766 A1 | | 9/2008 | Arensdorf et al. |
| 2008/0313793 A1 | * | 12/2008 | Skottheim .......... A41D 13/0531 2/463 |
| 2009/0165193 A1 | * | 7/2009 | Michel ............... A41D 13/0153 2/24 |
| 2010/0293703 A1 | * | 11/2010 | Tezartes-Strauss ......................... A41D 13/0153 2/455 |
| 2011/0035864 A1 | | 2/2011 | Gordon et al. |
| 2011/0189444 A1 | | 8/2011 | Beers |
| 2013/0042377 A1 | * | 2/2013 | Moore .................... B63C 11/04 2/2.16 |

FOREIGN PATENT DOCUMENTS

| | | |
|---|---|---|
| EP | 0 083 454 | 7/1983 |
| EP | 1 410 726 A1 | 4/2004 |
| GB | 2 352 208 | 1/2001 |
| JP | 10-337797 | 12/1998 |
| WO | WO 97/33493 | 9/1997 |
| WO | WO 98/53980 | 12/1998 |
| WO | WO 01/03530 | 1/2001 |
| WO | WO2008/044007 | 4/2008 |
| WO | WO2008/044015 | 4/2008 |
| WO | WO 2010/104868 | 9/2010 |

* cited by examiner

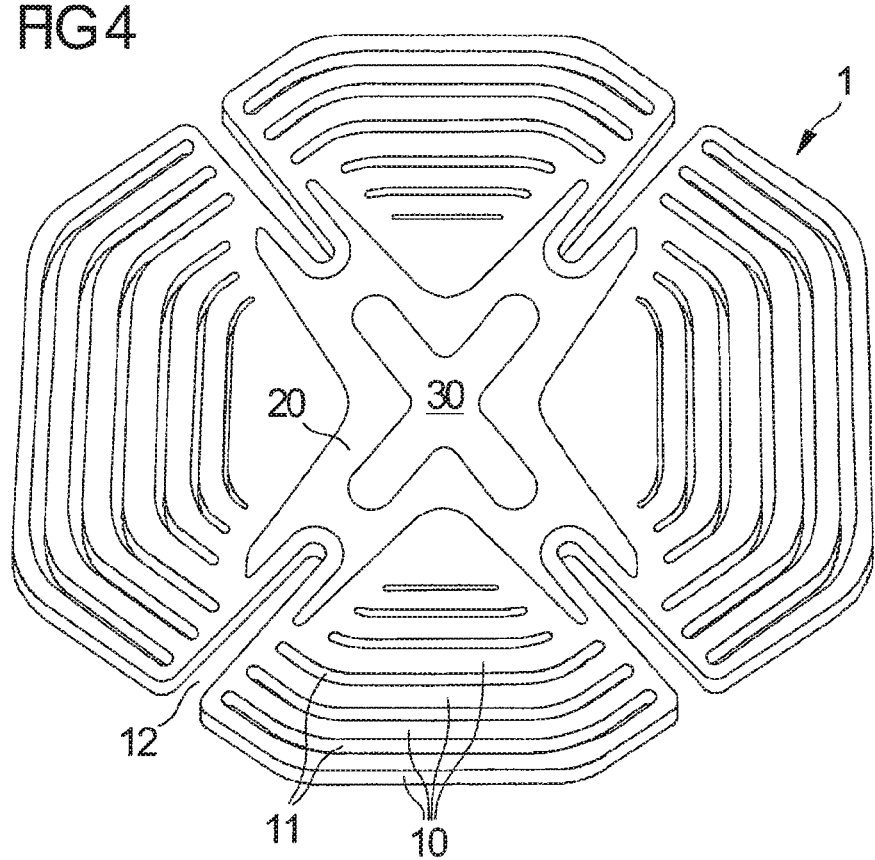
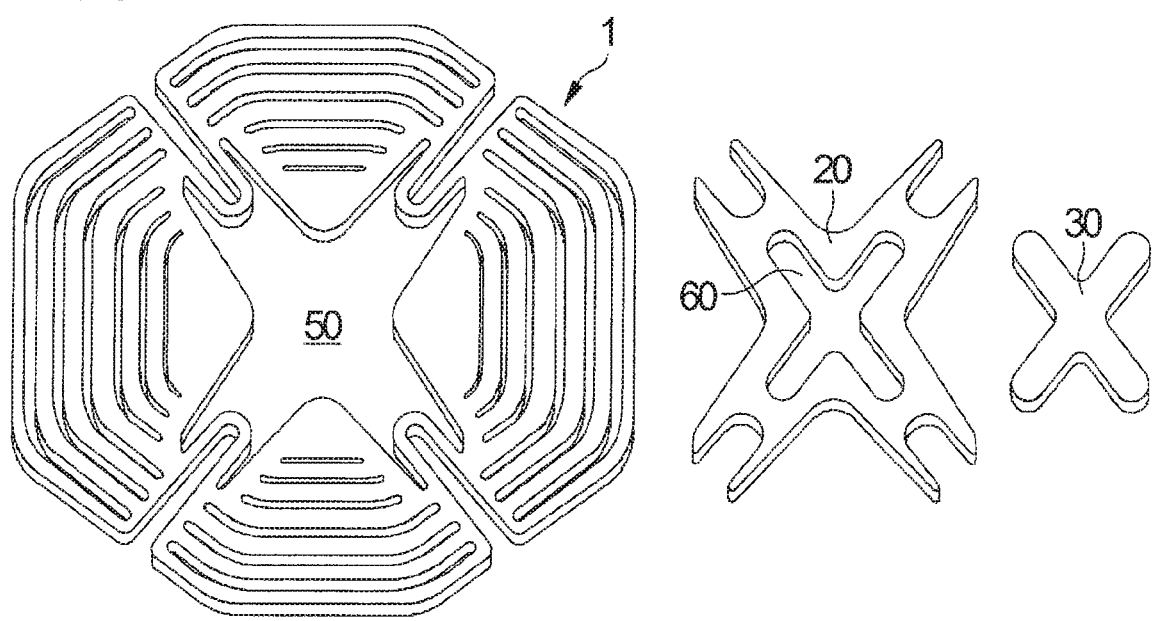

FIG 8
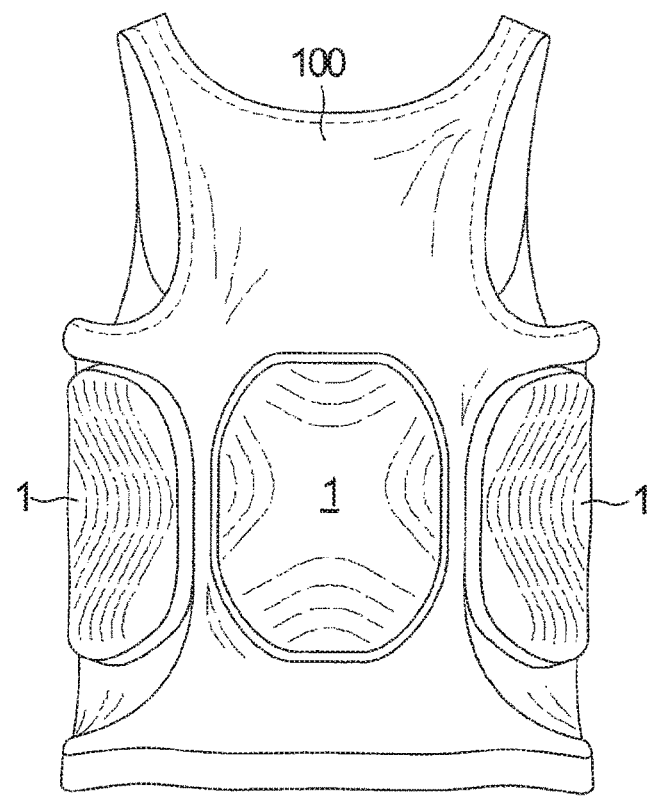
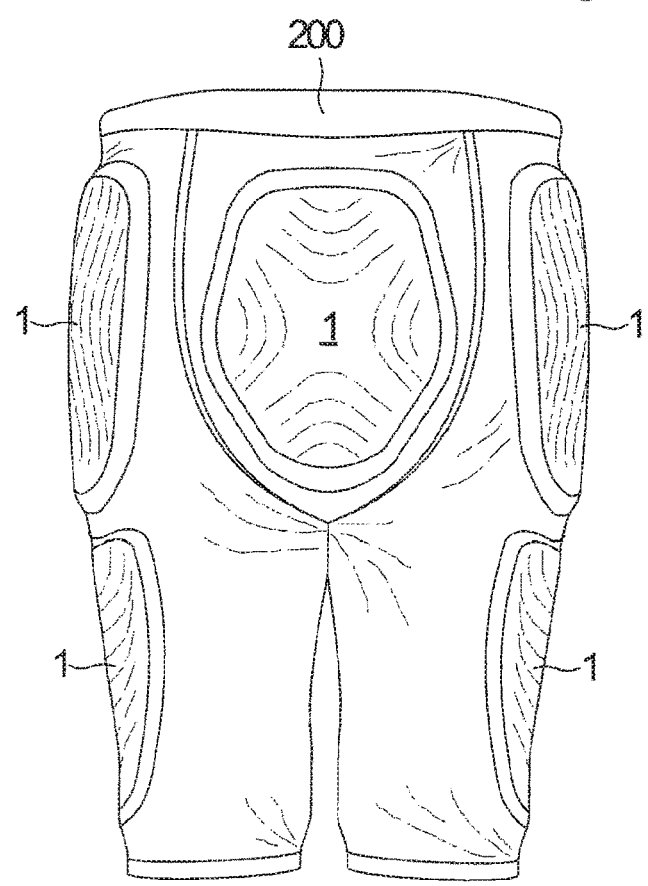

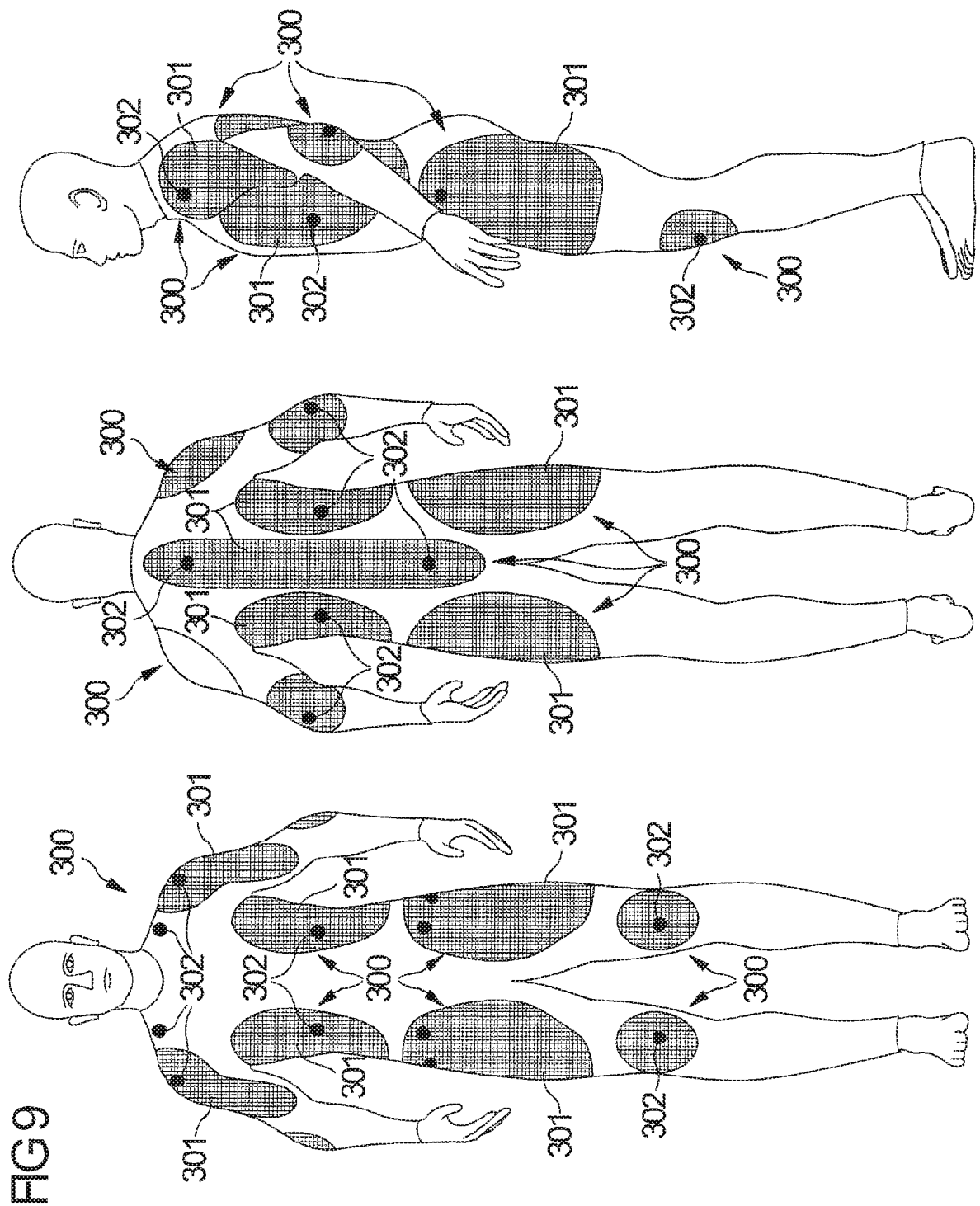

PAD FOR A GARMENT, PADDED GARMENT AND METHOD OF MANUFACTURING SAME

CROSS-REFERENCE TO RELATED APPLICATION

This application is a divisional of U.S. patent application Ser. No. 14/572,095, filed Dec. 16, 2014, titled "Pad for a Garment, Padded Garment and Method of Manufacturing Same," which is incorporated herein in its entirety by reference thereto. U.S. patent application Ser. No. 14/572,095 is a divisional of U.S. patent application Ser. No. 12/617,344, filed Nov. 12, 2009, titled "Pad for a Garment, Padded Garment and Method of Manufacturing Same," which is incorporated herein in its entirety by reference thereto.

BACKGROUND OF THE INVENTION

Field of the Invention

The present invention relates to a pad for a garment, a garment including such a pad and a manufacturing method for the pad.

Background Art

Padded garments are used for a number of reasons. The most important objective is the cushioning of impact forces, for example to avoid injuries in sports involving frequent and heavy body contacts such as rugby, American football, ice hockey, basketball, boxing etc. In addition, the body must be protected against injuries caused by ground contact, for example in sports like volleyball, show jumping, mountain biking, skiing, ice or roller skating, motor bicycle riding etc. Furthermore, padded garments are useful to avoid injuries of the elderly, for example to avoid a femoral neck fracture, which presents a major risk for older women.

If cushioning was the only objective, parts or even the complete garment could be made from a homogenous cushioning material. However, other functional aspects are relevant as well such as wearing comfort, breathability, weight and flexibility to adapt to the changing shape of the body so that movements of the wearer are impaired as little as possible. Any padded garment is therefore always a compromise between these conflicting design objectives.

In the prior art, a number of approaches are disclosed for providing a pad. For example U.S. Pat. No. 6,743,325 discloses a pad consisting of a multitude of separate resilient elements joined to a stretchable substrate. While this design improves the flexibility and air permeability of the pad, it has a reduced lifetime since the individual and separate elements may easily become detached from the substrate. This is a catastrophic failure, since it leads to a complete loss of the cushioning function in the section of the pad, where the lost element was arranged.

U.S. Pat. No. 6,408,446 discloses a pad to be arranged in a pocket of protective underwear. The pad has a rounded shape and comprises a number of slits cut through the cushioning material. However, from the figures of this document, it is apparent, that the slits are effectively closed unless the pad is stretched so that only a very limited amount of air and humidity can pass through. As a result, the pad of U.S. Pat. No. 6,408,446 does not provide an acceptable wearing comfort, in particular if a garment comprises a plurality of such pads.

U.S. Pat. No. 4,479,269 also discloses a pad to be inserted into a pocket of a garment, in particular of a pair of trousers. The pad comprises first and second components on opposite sides, which are interleaved and made from materials of different hardness. Again, the closed structure of the pad impairs the exchange of air and humidity and thus the performance of an athlete.

U.S. Pub. No. 2006/0179545 discloses another pad to be inserted into a pocket of a pair of trousers. The pad is comparatively dense and comprises only tiny perforations for the exchange of air and humidity.

As a result, none of the pad designs known from the prior art present the above mentioned ideal compromise between the various design objectives for a perfect pad. It is therefore the problem underlying the present invention to provide a pad, a garment and a manufacturing method, which at least partly overcomes the deficiencies of the prior art mentioned above.

BRIEF SUMMARY OF THE INVENTION

This problem may be solved by the embodiments of the present invention. In one embodiment, a pad for a garment may comprise a one piece structure comprising interconnected elements made from a first compressible material. The elements are arranged such that, when the pad is in a non-deformed state, each element is spaced apart from adjacent elements by a void. The elements are interconnected such that, when the pad is deformed the void between at least two adjacent interconnected elements is expanded. In the deformed state a zigzag arrangement of at least three elements is formed and/or a void enclosed by at least two adjacent elements is expanded.

The pad assures that even in a non-deformed, i.e. relaxed state, sufficient ventilation and breathability of a garment including such a pad. In contrast to the slits of the U.S. Pat. No. 6,408,446, which are only "opened" if the pad is subjected to substantial longitudinal stress, the spaced arrangement of the elements of the present invention enables an almost unhindered exchange of humidity and air through the non-deformed pad.

The unique interconnection of the elements of the pad provides a high degree of flexibility under movements of the body. Rather than having to stretch the entire pad, it is sufficient if the interconnections of the elements are slightly deformed to obtain the zigzag arrangement or to further expand the void between adjacent elements. As a result, the forces for adapting the pad to body movements are substantially lower than for a pad made from a continuous piece of cushioning material, as for example the pad disclosed in U.S. Pub. No. 2006/0179545.

At the same time, however, the structural integrity of the pad may be assured. In contrast to the multitude of separate resilient elements disclosed in U.S. Pat. No. 6,743,325, the interconnected elements of the claimed pad are provided as a one piece structure. Such a pad remains attached to a fabric of a garment even in case of a localized failure of the attachment between an individual element and the fabric.

In one embodiment, the elements may extend essentially parallel to one another in the non-deformed state of the pad. Such an arrangement leads to a homogeneous distribution of the elements on the part of the body to be protected.

Further, the elements of the one piece structure may be essentially straight or curved.

The zigzag arrangement mentioned above may be preferably formed by interconnecting at least three elements at alternating ends of the elements. In some embodiments the alternating ends may further comprise sections extending outwardly from the interconnections. As a result, the cushioning protection provided by the pad may be further improved without reducing its flexibility to adapt to a changing shape of the body part to be protected.

In some embodiments the elements may define a first cut-out and a first insert made from a second compressible material may be arranged in the first cut-out. The first cut-out may be arranged in a centre of the pad. The second compressible material may be harder or softer than the first compressible material. Preferably, the first insert and the first cut-out may have a complementary shape so that the first insert may be arranged with a positive fit inside the first cut-out.

Providing such an insert from a harder material may improve the protection for certain parts of the body, for example the ankle or the elbow, without unduly restricting the flexing movements of the wearer, since the major part of the pad is still made from a softer material. In a more advanced embodiment, the first insert may comprise a second cut-out, wherein a second insert made from a third compressible material may be arranged inside the second cut-out.

According to a further aspect, the present invention relates to a garment, in particular a sports garment comprising a pad as described above. The pad may be preferably attached to a stretchable fabric. The flexibility of the pad and the fabric provide a garment, which is comfortable to wear, does not restrict the movements of the wearer but still provides a reliable protection against impacts.

According to a still further aspect, the present invention relates to a method for manufacturing a padded garment as mentioned above comprising the steps of forming a one piece structure comprising interconnected elements made from a first compressible material, wherein the elements are arranged such that, when the pad is in a non-deformed state, each element is spaced apart from adjacent elements, and attaching the elements of the one piece structure to a fabric of the garment wherein the elements are interconnected such that, when the pad is deformed, a zigzag arrangement of at least three elements is formed and/or a void enclosed by at least two adjacent elements is expanded.

In one embodiment, the step of forming may comprise cutting the one piece structure comprising interconnected elements from a block of the first compressible material, for example with a die cutter or a laser beam. This technique allows one to design a pad with well-defined structures specifically adapted to the body part to be protected.

Alternatively, the one piece structure comprising interconnected elements may be formed by molding, wherein the step of molding the one piece structure comprising interconnected elements may include the step of bonding it to the fabric. Such a production of the garment is particularly efficient, since no additional gluing, welding or other technique is needed to connect the pad to the fabric of the garment.

If materials of different hardness are needed for the pad, the molding step may comprise multi-component injection molding of the first compressible material and a second compressible material, such as the harder material of the insert mentioned above.

Further modifications of the claimed pad, the garment and the method of manufacture are the subject matter of further dependent claims.

BRIEF DESCRIPTION OF THE DRAWINGS/FIGURES

The accompanying drawings, which are incorporated herein and form a part of the specification, illustrate the present invention by way of example, and not by way of limitation. The drawings together with the description, further serve to explain the principles of the invention and to enable a person skilled in the pertinent art to make and use the invention.

FIG. 4 is a still further embodiment of the invention including two inserts;

FIG. 5 is the disassembled pad of FIG. 4 of the invention comprising two inserts;

FIG. 8 is a shirt and a pair of trousers comprising various pads; and

FIG. 9 is an impact map of an athlete illustrating preferred positions for pads.

DETAILED DESCRIPTION OF THE INVENTION

Figure 1:
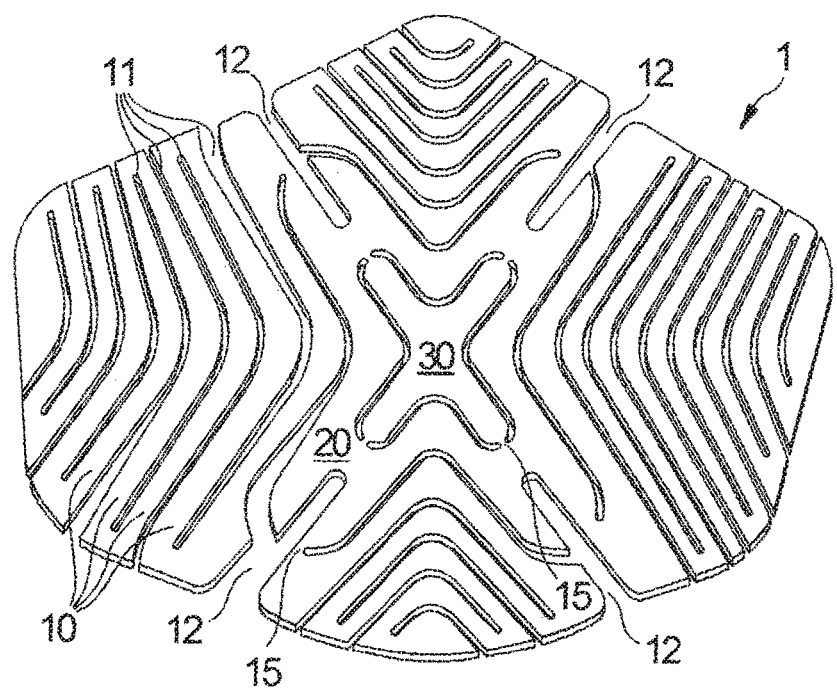
FIG. 1 is a first embodiment of a pad according to the present invention; (00271 FIG. 2 is the pad of FIG. 1 in a partially stretched state.

In the following, various embodiments of a pad and a padded garment are described, wherein the pads are designed to cushion external impacts on the body of a wearer of the padded garment as they are encountered in many sports. However, the described pads may apart from serving as a general safety or protecting gear also be used for other purposes, for example to modify the visual appearance of the wearer of the garment, for medical reasons or as a buoyancy/swimming aid to increase the buoyancy of the wearer or a combination of such purposes. For example in water sports it is highly desirable to use pads, which can cushion an impact, for example of a surf or kite board, but which also keep the athlete afloat. Further, it is expressly noted that the dimension and the details of the structure of a pad according to the invention may substantially differ from the embodiments shown in the drawings and discussed below.

FIG. 1 presents a first embodiment of a pad 1 in a non-deformed state, i.e. in a state without any stretching forces acting on the pad 1. As can be seen, the pad 1 may comprise a plurality of elements, some of which are marked with the reference numeral 10. The elements 10 of the pad 1 may be integrally made as one piece. Even the centre portions 20, 30 of the pad 1 of FIG. 1 may be integrally connected to the other elements 10 via small ridges 15. As a result, when the pad 1 is attached to a fabric and if one or more elements 10 become detached from the fabric, for example due to highly abrasive forces acting on the outside of the pad 1, the detached elements 10 may still remain connected to the remainder of the pad 1 and can still contribute to the cushioning protection.

FIG. 1 further shows that a plurality of the elements 10 may extend in an essentially parallel, curved configuration. More precisely, in the presented embodiments, there may be four groups of essentially parallel, curved elements 10 on the four sides of the pad 1. The term "essentially parallel" for the purposes of the present invention includes a parallel orientation with deviations of up to 50, wherein the elements 10 may be curved or not. In the non-deformed state of FIG. 1, the elements 10 may be mutually spaced apart from another. The empty spaces 11 extending between adjacent elements 10 may facilitate the evaporation of humidity and the exchange of air through an underlying fabric (not shown in FIG. 1). In addition, there may be four major cut-outs 12 between the four groups of elements 10 extending radially from the centre portions 20, 30 of the pad 1 to the outside. The cut-outs 12 may facilitate an independent flexing of the elements 10 of each of the four groups. The wider the empty spaces 11 and the cut-outs 12, the better are the ventilation properties and the flexibility of a garment comprising such a pad. On the other hand, for a pad of a given size, wider empty spaces 11 will lead to less cushioning material being available to absorb and cushion an external impact.

The elements 10 of the embodiment of FIG. 1 may be made from a compressible material which is suitable to absorb or at least cushion external impacts. In one embodiment a foamed material, such as a closed-cell foam made from ethylene-vinyl-acetate (EVA) or polyurethane (PU) may be used. A closed cell foam is preferred, since it does not absorb humidity such as sweat and allows that the pad can serve as a buoyancy/swimming aid. However, open cell foams and other cushioning materials could be used as well, wherein materials combining good impact absorption with a low weight are preferred. The Asker C hardness of the pad materials may be in the range of 20-80 and depends on the intended field of use. More advanced pad materials, may provide further functions of the pad such as an adaptation to humidity and/or temperature, for example to automatically improve the ventilation properties, if needed. For example, if a foam is used that significantly shrinks or opens up in case of increasing humidity, the pad will lead to improved breathability, when the athlete starts to sweat. In a similar manner, an "intelligent foam" could have an increasing hardness upon impact.

In the embodiment of FIG. 1, the pad 1 may have a homogeneous thickness of 8 mm, which provides good cushioning without making a padded garment too bulky. The thickness depends also on the intended field of use and on the involved materials. For EVA and PU foams typical thickness values may be in the range of 3-15 mm. It is to be noted, however, that the thickness of the pad can vary. For example, the centre part of a pad could be made thicker to provide more cushioning at the location of a certain bone such as the tailbone.

While the pad 1 shown in FIG. 1 is made from a single material, it is also conceivable to manufacture different elements 10 of the pad from different materials, for example by multi-component injection molding, or to use several materials within a single element 10. Further, the pad 1 may comprise two or more layers, for example a harder foam on the outside for an improved impact protection on top of a softer foam layer, which is in direct contact with the fabric and therefore provides more comfort towards the body. In addition, the pad 1 may be three-dimensionally shaped in order to improve the fit to the parts of the body, which are to be protected, for example a certain joint or the hip. Using forming techniques known by the person skilled in the art, the pad could either be three-dimensionally shaped during its manufacture (which is described in more detail below) or afterwards, for example in the context of a customization for an individual athlete.

Figure 2:
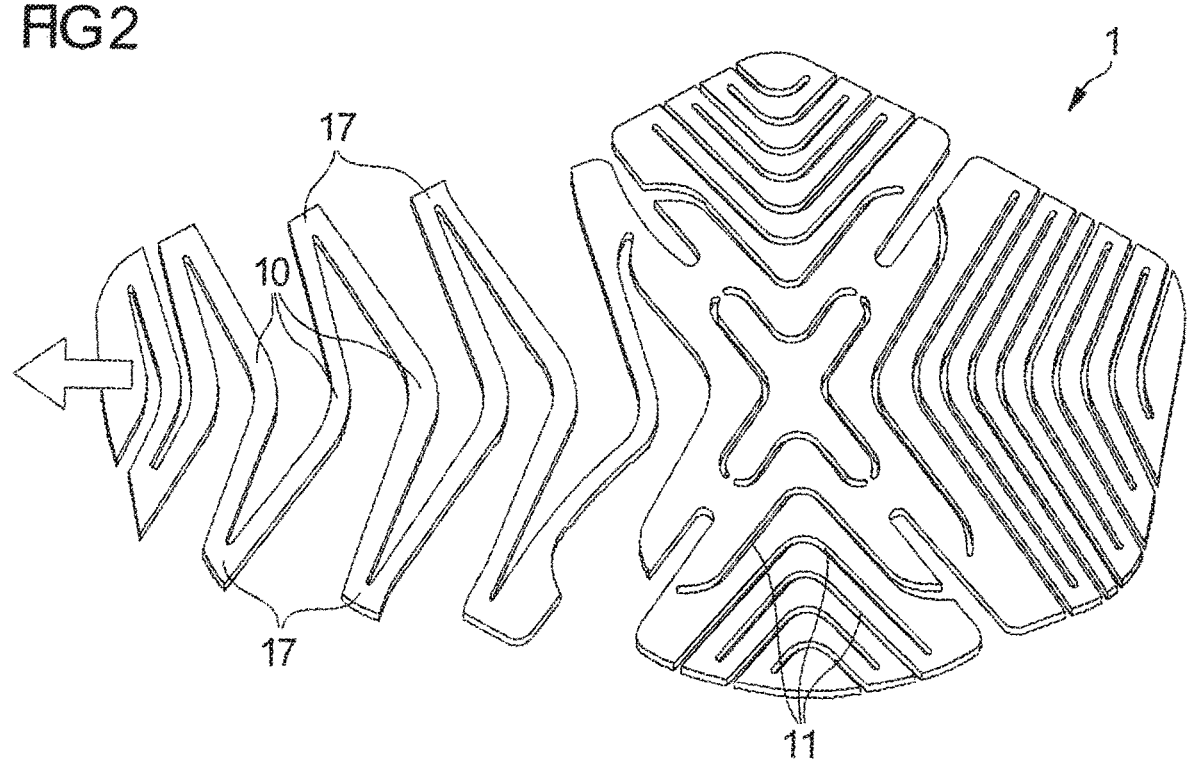

FIG. 2 shows a deformation of the pad 1 of FIG. 1 when a stretching force (shown by the arrow) acts on the left side of the pad 1. As can be seen, the elements provided with the reference numeral 10 in FIG. 2 are no longer parallel but in a zigzag arrangement. The shape of an individual element 10 may remain essentially the same however, the interconnections with adjacent elements 10 at alternating ends 17 of the elements 10 may be deformed to provide the extended shape of the pad 1 as shown in FIG. 2, which requires only a very small force. Further, due to the radial cut-outs 12, the group of elements 10 directed to the applied force can yield by changing into the zigzag arrangement, while the other parts of the pad 1 remain substantially unaffected. As a result, a highly flexible pad 1 may be provided that shows almost no resistance to movements of the body, which permits a stretching of the pad.

Figure 3:
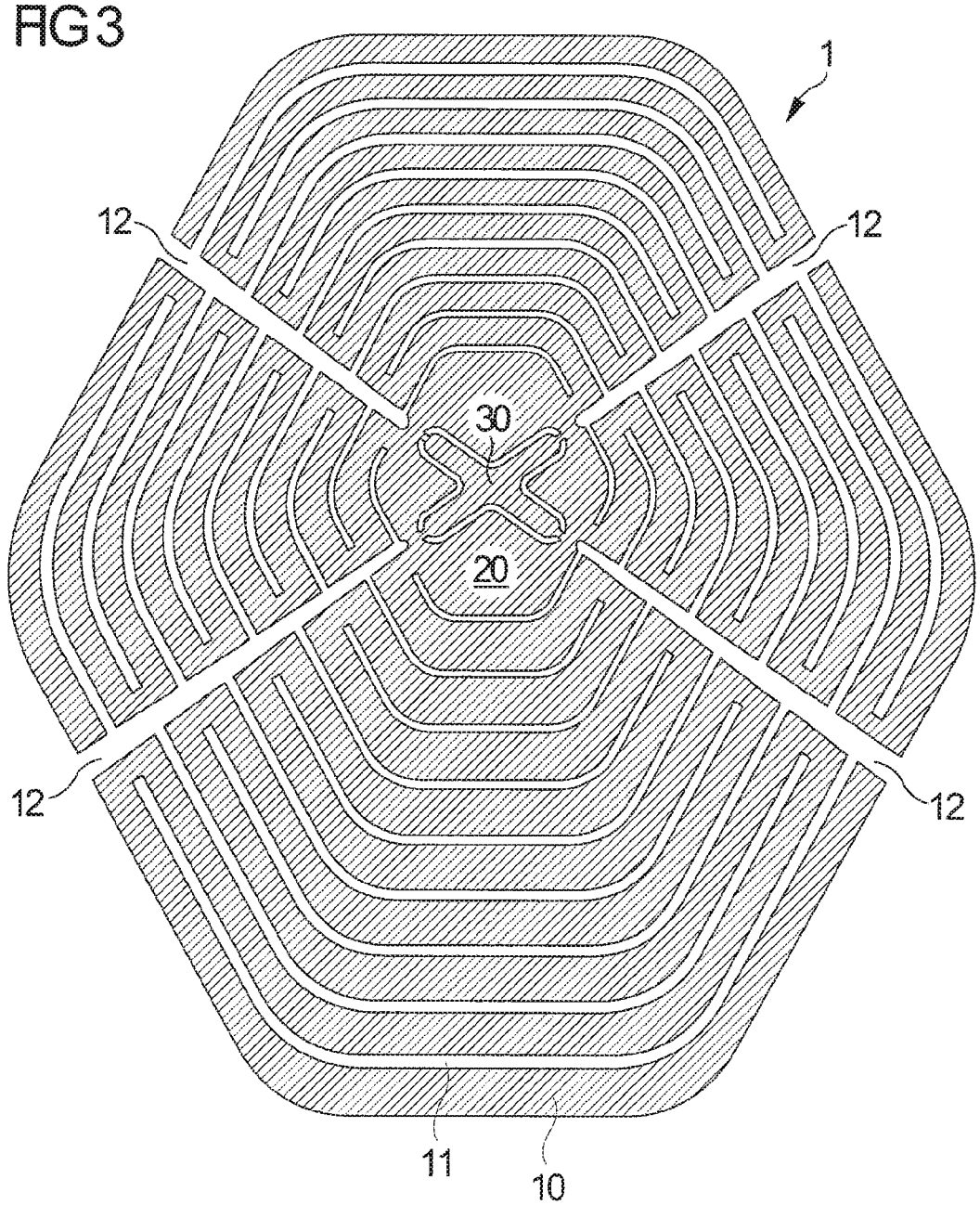
FIG. 3 is a schematic representation of a further embodiment of a pad according to the invention.

FIG. 3 schematically presents a further embodiment of a pad 1. As can be seen, the structure of the elements 10 is more regular in this embodiment than in the embodiment of FIG. 1. In particular, the elements 10 may be parallel to one another and the spaces 11 between the elements 10 may also be parallel to one another. Again, the complete pad 1 may be preferably provided as one piece structure including the centre portions 20 and 30. The elements 10, all of which are interconnected, may be arranged in four groups separated by radial cut-outs 12.

FIGS. 4 and 5 present further embodiments with a different arrangement of the elements 10. Here, adjacent elements 10 may be connected to one another at both ends. This results in an arrangement where two adjacent elements 10 enclose a void 11 between them. When the pad is stretched, the void 11 will expand (not shown in FIGS. 4 and 5). Again, the resistance to such a stretching is only the bending of the cushioning material at the connected ends 17 of the elements 10. Therefore, the embodiment of FIGS. 4 and 5 may also provide only a minor resistance against body movements, which involve the stretching of a padded garment. Furthermore, the open structure of the pads of FIGS. 4 and 5 with comparatively wide voids 11 may provide superior ventilation properties already in the non-deformed state of the pad 1.

The cushioning properties of the pads 1 of the invention may be further improved if the centre portions 20 and 30 are made from a different material than the elements 10. For example in the embodiment shown in FIG. 5, there may be two inserts 20 and 30 which may be made from harder materials than the elements 10, wherein the insert 30 may comprise the hardest material. Such a design may be particularly advantageous if a certain bone or joint is to be protected such as the tailbone, the ankle, the knee or the elbow. In one embodiment, the insert 20 may for example be made from an EVA having an Asker C hardness in the range of 30-70, whereas the insert 30 may have a Asker C hardness in the range of 40-80.

FIG. 9 illustrates exemplary impact zones on the body of an athlete, which are to be protected by one or more pads of the invention. The specific arrangement, however, will depend on the gender and the size of the athlete as well as the specific type of sport to be performed. Further, FIG. 9 shows that for each impact zone 300, there may be a muscular impact zone 301 and a more localized skeletal impact point 302, i.e. one or more bones of the human skeleton, which are to be protected against an external impact. However, depending on the parameters mentioned above, there could also be a muscular impact zone 301, which does not encompass a skeletal impact point 302 or which encompasses more than one skeletal impact point 302 (as can be seen in the rear view of the athlete in the centre of FIG. 9). Further, there may also be isolated skeletal impact points 302, without any surrounding muscular impact zone 301. The harder inserts 20, 30 described above may be arranged within a pad 1 in such a manner that they overlay and thereby protect a skeletal impact point 302, whereas the surrounding pad may be made from a softer material and protects the muscular impact zone 301, without unduly limiting the freedom to move of the athlete.

Depending on the manufacturing method, the inserts 20 and 30 can be integrally connected to the other parts of the pad (as in the design of FIG. 1-3) or they may be separately manufactured and subsequently inserted into the pad 1. In this case, the cut-outs 50 and 60 receiving the inserts 20 and 30, respectively, may be correspondingly shaped such that there may be a positive locking with the surrounding material of the pad 1.

While the embodiment of FIG. 5 shows two inserts 20, 30 made from materials with increasing hardness, it is also conceivable to provide even more inserts and/or to provide softer materials in the centre of the pad 1 or materials distinguishing in other aspects over the surrounding pad material, such as the resiliency or thickness of the material under compression. For example a gel-like material provides less resiliency during cushioning than a standard EVA foam. The design of the pads of the present invention provides a wide range of options for the person skilled in the art to adapt the pad of a garment to the specific needs of its wearer and to optimize properties such as ventilation, cooling etc. If replaceable pads or inserts are used, a wearer himself may be able to customize the cushioning and other properties of the padded garments according to his specific needs, for example after an injury or for an adaptation to a specific kind of sport. To this end hook and loop fastener connections could be used to removably attach an insert and/or the complete pad. Alternatively, a pad could be inserted into a corresponding pocket or a heat activated adhesive can be used to attach the pad to a garment.

Figure 6:
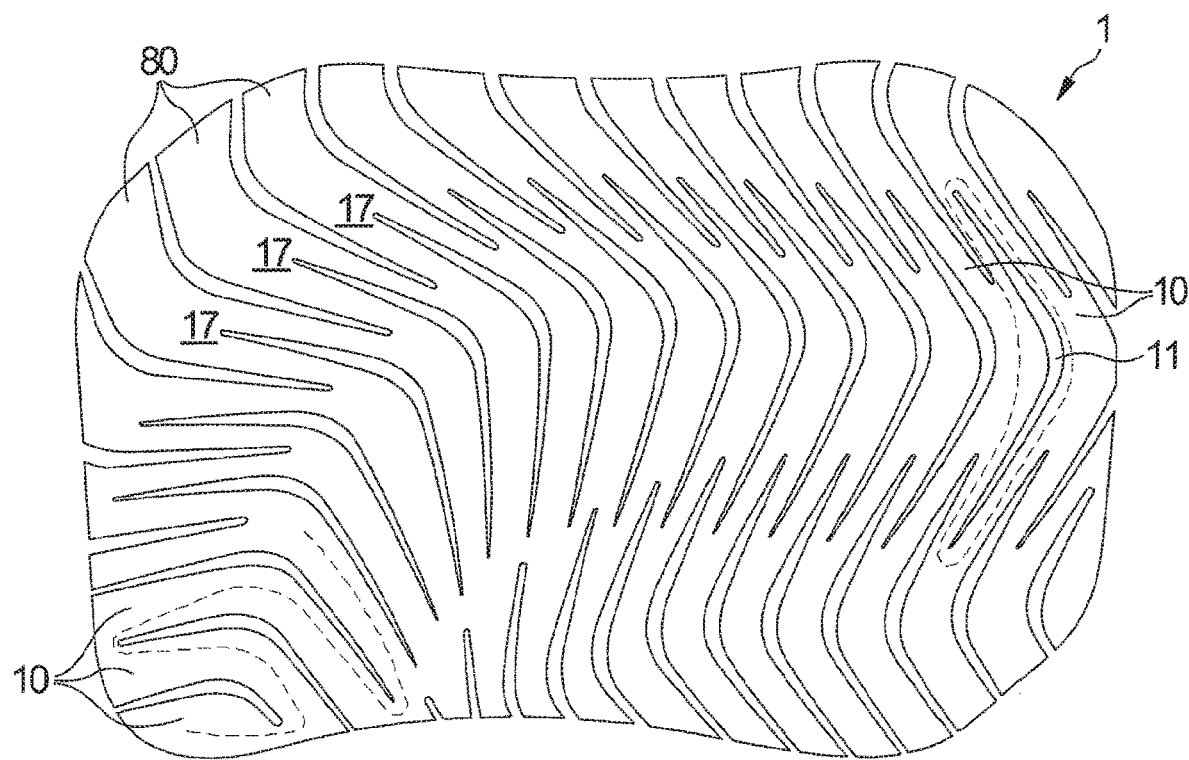
FIG. 6 is a schematic representation of a further embodiment of a pad according to the invention.

FIG. 6 presents a pad design comprising elements 10, which, when the pad is deformed, will form a zigzag arrangement, as well as an expanded void 11 enclosed by two or more adjacent elements 10. For an easier understanding of the complex element arrangement of the pad 1 of FIG. 6, some exemplary elements 10 forming the zigzag arrangement are marked with a dashed line. Other exemplary elements 10 may enclose a void 11 which expands when the pad 1 is stretched, and are marked with a dotted line. Such a design combines the advantages of the two alternatives, namely an easier flexing of the pad 1 for the zigzag arrangement and the higher stability and structural integrity for the elements 10 enclosing a void 11 which expands when the pad is deformed.

Furthermore, the pad 1 of FIG. 6 shows sections 80 extending outwardly from the pad 1 beyond the ends 17 of the elements 10, where two adjacent elements 10 are interconnected. Such sections 80 provide additional cushioning material coverage for parts of the body without further restricting the freedom of movement for the wearer of the padded garment. The isolated sections 80 can freely flex in almost arbitrary directions without creating tensions within the pad 1.

Figure 7:
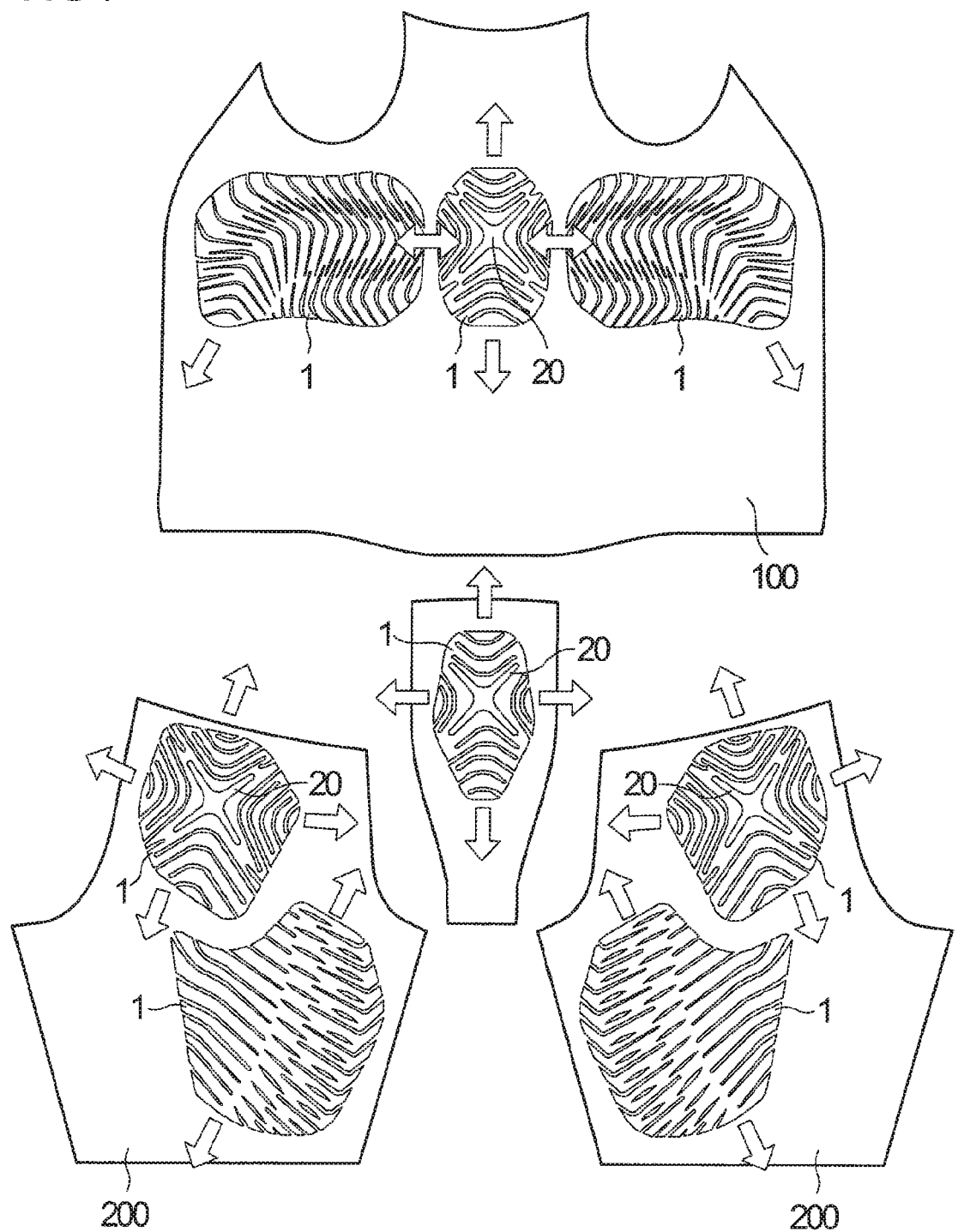
FIG. 7 is a schematic presentation of a possible distribution of various pads on a shirt and the parts of a pair of trousers.

FIGS. 7 and 8 show an exemplary distribution of pads 1 in a shirt 100 and in a pair of trousers 200. As mentioned already above with respect to FIG. 9, the preferred distribution depends on many different parameters and in particular the type of sport to be performed. As can be seen in the upper half of FIGS. 7 and 8, the pads 1, in one embodiment, may be arranged around the torso and cover in particular the spine and the ribs. The lower parts of FIGS. 7 and 8, respectively show pads for a pair of trousers 200. Here the pads may be arranged on the hips, the sides of the thighs and the tailbone. Pads which cover a bone, which is likely to be injured under a heavy impact, such as the spine, the tailbone or the hip bone, may be specifically protected by an additional insert 20 as explained above, whereas pads protecting muscles such as the two lower pads for the pair of trousers 200 may be designed to provide medium shock absorption along a larger area.

Further, it can be seen that the elements 10 of the pads 1 are preferably arranged in a direction which is essentially perpendicular to at least one expected stretching direction for the pad (possible expected stretching directions for the pads are illustrated by the arrows in FIG. 7). However, if it turns out that for example the predominant stretching direction for pads on the thighs is different from the arrow shown in FIG. 7, the orientation of the pad could be correspondingly adapted. Such a biomechanically adapted arrangement of the pads 1 combines an effective protection with the greatest amount of flexibility for the wearer of the padded garments 100, 200.

FIG. 8 shows the resulting garment. As can be seen, the various pads 1 are integrated into the garment 100, 200, i.e. there is a fabric not only between the skin and each pad but also on top of the pad covering it from the outside. However, other arrangements are also conceivable, for example wherein the pads are not provided with an outer cover or even wherein the pads at least partially replace the fabric of the garment. Further, the pads described above can also be incorporated into other types of garments such as long-arm shirts or leg sleeves.

Exemplary manufacturing methods for the pad and the padded garment are described below. However, it is to be understood that the pads and the garments described above can be produced in a number of ways, only a few of which are discussed below.

In one embodiment, the pad may be produced by die-cutting the one piece structure comprising interconnected elements from a block of foamed material such as the EVA or PU based foam mentioned above. Several pads may be produced in a single cutting step. The die cutter may be filled with a material between its cutting blades, which is resilient, but softer than the foamed material to be cut. Accordingly, during the cutting step, the softer material is compressed. When the die cutter is removed, the softer material around the cutting blades pushes the foamed material away from the cutting blades so that it can be removed from the die cutter for further processing. In other words, the resilient filler material lifts out the cutter from the block of material. In a subsequent processing step, the individual pads are then removed from the surrounding/excess foamed material, to which they are no longer connected.

Alternatively, or additionally, the pads may also be cut by using an energy transmitting beam such as a laser beam. Other beams are conceivable as well, such as an electron beam or a highly focused water beam.

If the pad 1 is cut from a block of material, a further process step may be needed to attach the pads 1 to the fabric of a garment. This can be done in a number of ways, for example by arranging the pad in a kind of pocket of the garment, by sewing it to the fabric or by using an adhesive, for example a heat activatable adhesive or the like. Also combinations of the various attachment methods can be used. The fabric can be attached to an upper and/or a lower side of the pad and even to its narrow sides. As in the case of the specific size and shape of the pads, this will depend on the intended field of use for the garment.

In an alternative manufacturing method, a PU material may be poured into an open mold having an internal shape corresponding to one or more pads. If injection molding is used, several materials may be combined by multi-component injection molding, for example a harder material for the centre of a pad and a softer material for its outer regions. The injection molding may be followed by a separate foaming step. For certain combinations of pad materials and fabric, it is possible to directly inject or pour the pad material onto the fabric. For example a PU material can be directly injected or poured onto a fabric placed in a mold, which fabric is preferably pre-treated with a film cover to prevent the PU material from soaking through the fabric. As a result, no further process step is needed to attach the pad to the fabric.

As a part of the above described manufacturing methods, the pads may in addition be texturized and/or modified using high frequency welding. This technique allows the provision of grooves and rounded edges on the outer surface of the pads which facilitates the integration of the pads into a garment. Other techniques for texturizing are conceivable as well such as laser etching, embossing or compression molding. In addition to texturizing the pad, high-frequency welding can also be used to seal a pocket of a fabric around a pad and/or to interconnect the pad to the fabric.

What is claimed is:

1. A method for manufacturing a padded garment, the method comprising:
    forming a one-piece monolithic pad comprising an overall thickness measured between a first surface and a second surface, and interconnected elements made from a first compressible foamed material; and
    attaching the interconnected elements of the one-piece pad to a fabric of the garment,
    wherein the pad has a non-deformed state and a deformed state,
    wherein when the pad is in the non-deformed state, each interconnected element is spaced apart from adjacent interconnected elements, and at least two adjacent interconnected elements extend essentially parallel to one another and are curved,
    wherein when the pad is in the non-deformed state, the one-piece pad defines a first void and a second void extending entirely through the overall thickness of the pad such that each interconnected element is spaced apart from adjacent interconnected elements and the first void and the second void are each enclosed by at least two adjacent interconnected elements,
    wherein when the pad is in the non-deformed state the first void and the second void extend essentially parallel to one another, and
    wherein when the pad is deformed at least one of the first void or the second void is expanded.

2. The method of claim 1, wherein forming the one-piece monolithic pad comprises cutting the one-piece pad comprising the interconnected elements from a block of the first compressible foamed material.

3. The method of claim 2, wherein the cutting comprises cutting with a laser beam.

4. The method of claim 1, further comprising forming the one-piece monolithic pad such that the interconnected elements define a cut-out and arranging an insert made from a second compressible material in the cut-out.

5. The method of claim 4, wherein the insert is integrally connected to the one-piece monolithic pad.

6. The method of claim 4, wherein the insert is separately manufactured and subsequently inserted into the one-piece monolithic pad.

7. The method of claim 1, wherein the one-piece monolithic pad is formed by molding.

8. The method of claim 7, wherein the molding comprises bonding the interconnected elements to the fabric.

9. The method of claim 4, wherein the one-piece monolithic pad is formed by molding, and wherein the molding comprises multi-component injection molding of the first compressible foamed material and the second compressible material.

10. A method for manufacturing a padded garment, the method comprising:
    forming a one-piece monolithic pad comprising an overall thickness measured between a first surface and a second surface, and interconnected elements made from a first compressible foamed material; and
    attaching the interconnected elements of the one-piece pad to a fabric of the garment,
    wherein the pad has a non-deformed state and a deformed state,
    wherein when the pad is in the non-deformed state, each interconnected element is spaced apart from adjacent interconnected elements, and at least two adjacent interconnected elements extend essentially parallel to one another and are curved,
    wherein when the pad is in the non-deformed state, the one-piece pad defines a first void and a second void extending entirely through the overall thickness of the pad such that each interconnected element is spaced apart from adjacent interconnected elements,
    wherein when the pad is in the non-deformed state the first void and the second void extend essentially parallel to one another, and
    wherein when the pad is deformed at least one of the first void or the second void is expanded.

11. A method for manufacturing a padded garment, the method comprising:
    directly molding a one-piece monolithic pad on a fabric surface of the garment, the one-piece monolithic pad comprising interconnected elements made from a first compressible foamed material, and an overall thickness measured between a first surface and a second surface;
    wherein the first surface of the one-piece monolithic pad is directly attached to the fabric surface of the garment,
    wherein the pad has a non-deformed state and a deformed state,
    wherein when the pad is in the non-deformed state, each interconnected element is spaced apart from adjacent interconnected elements, and at least two adjacent interconnected elements extend essentially parallel to one another and are curved,
    wherein when the pad is in the non-deformed state, the one-piece pad defines a first void and a second void extending entirely through the overall thickness of the pad such that each interconnected element is spaced apart from adjacent interconnected elements,
    wherein when the pad is in the non-deformed state the first void and the second void extend essentially parallel to one another, and
    wherein when the pad is deformed at least one of the first void or the second void is expanded.

* * * * *